United States Patent
Bristow, Jr.

(10) Patent No.: US 9,570,969 B1
(45) Date of Patent: Feb. 14, 2017

(54) ELECTRICAL GENERATOR

(71) Applicant: Theodore R. Bristow, Jr., Kailua-Kona, HI (US)

(72) Inventor: Theodore R. Bristow, Jr., Kailua-Kona, HI (US)

( * ) Notice: Subject to any disclaimer, the term of this patent is extended or adjusted under 35 U.S.C. 154(b) by 147 days.

(21) Appl. No.: 14/548,114

(22) Filed: Nov. 19, 2014

(51) Int. Cl.
| H02K 16/02 | (2006.01) |
| H02K 47/00 | (2006.01) |
| H02K 35/02 | (2006.01) |
| H02K 16/04 | (2006.01) |
| H02K 53/00 | (2006.01) |

(52) U.S. Cl.
CPC .............. H02K 47/00 (2013.01); H02K 16/04 (2013.01); H02K 35/02 (2013.01); H02K 53/00 (2013.01); Y10S 74/09 (2013.01)

(58) Field of Classification Search
CPC ............. H02K 35/00; F03D 9/002; F03D 9/00
USPC .................. 310/36, 74, 80, 113; 290/44, 55
See application file for complete search history.

(56) References Cited

U.S. PATENT DOCUMENTS

| 4,260,901 | A | * | 4/1981 | Woodbridge | ....... F03B 13/1855 290/42 |
| 4,423,334 | A | * | 12/1983 | Jacobi | ..................... F03B 13/20 290/42 |
| 7,629,700 | B2 | * | 12/2009 | Begley | ................... H02K 35/02 290/1 R |
| 8,026,620 | B2 | * | 9/2011 | Hobdy | .................... F03B 13/20 290/42 |
| 8,456,029 | B2 | * | 6/2013 | Powers | .................... H02K 7/06 290/1 A |
| 8,816,541 | B1 | * | 8/2014 | Bristow | ................. H02K 35/02 310/113 |
| 8,836,152 | B2 | * | 9/2014 | Hobdy | .................... F03B 13/20 290/42 |
| 8,907,513 | B2 | * | 12/2014 | Hobdy | .................... F03B 13/20 290/53 |
| 2007/0035134 | A1 | * | 2/2007 | Bristow, Jr. | .............. F03G 3/06 290/1 R |

* cited by examiner

*Primary Examiner* — Naishadh Desai
(74) *Attorney, Agent, or Firm* — Theodore J. Bielen, Jr.

(57) ABSTRACT

An electricity generating utilizing rotatable arm having a permanent magnet that is consisted in rotation by an intermittently activated magnetic coil. The rotating arm is fixed to a pair of rotors that turn relative to a stator. The rotor includes a plurality of permanent magnets that interact with a plurality of electrical coils of the stator to produce electrical current.

4 Claims, 7 Drawing Sheets

ELECTRICAL GENERATOR

BACKGROUND OF THE INVENTION

The present invention relates to a novel and useful electricity generating apparatus.

The generation of electrical power is of utmost important in the modern world. Since the invention of the dynamo electrical power using this technology has been the dominant method throughout the world. For example, generators which rotate conductors or magnetic fields in a relative fashion are used to essentially convert mechanical energy into electrical energy. Such generators are also motivated by hydraulic force, steam produce by fossil fuel, and the like. Also electrical energy could be generated through mechanical rotation dynamos using wind and tidal sources. To a lesser extent, solar cells directly convert ultraviolet light into an electrical power using crystalline structures such as those of silicon, germanium, and the like.

As an alternative to electrical power plants, many systems have been proposed to generated electrical power in a similar manner. For example, U.S. Pat. No. 6,798,090 teaches the generation of electricity by multiple magnets located an axis which interact with electrical coils to produce current.

U.S. Pat. No. 2,810,083 and PCT Application WO93/05566 describe accelerating motors which use the interaction of magnets and coils in combination with pendulums.

U.S. Pat. Nos. 4,924,123, 5,818,132, and 6,172,426 show linear generators in which conductors are moved in a linear direction relative to coils in which electrical energy is generated.

U.S. Pat. No. 5,696,413 describes an electrical generator which shows a generator coil that slides over a pole core connected to a float member. The float member obtains movement from waves in a body of water.

U.S. Pat. No. 5,347,186 and Japanese Patent abstract 58200191 describe pendulum electrical generators which employ a permanent magnet that interacts with a coil to create an electrical current.

An electricity generating apparatus which is simple and reliable would be a notable advance in the field of power generation.

SUMMARY OF THE INVENTION

In accordance with the present invention a novel and useful electricity generating apparatus is herein provided.

The apparatus of the present invention utilizes a support having a rest or place of contact. A pendulum having an arm is utilized with a first end portion engaging the rest of the support and a second end portion distally located relative to such rest. The second end portion of pendulum travels in an arcuate path when the arm of the pendulum swings. The first end portion of the pendulum arm essentially rotates about or relative to an axis at the rest of the support.

An actuator is also employed in the present invention for swinging the pendulum about or relative to the axis. The actuator possesses a source of magnetic force located at the second end portion of the arm of the pendulum. In certain cases, the provision of such magnetic force includes a placement of a permanent magnet at the second end portion of the arm of the pendulum. A electromagnet is positioned in the vicinity of the permanent magnet in order to interact with the permanent magnet of the pendulum arm. In other words, the electro magnet is located adjacent arcuate path which the second end portion of the arm of the pendulum follows in its swinging motion. A switch selectively activates the electro magnet during portion of the swing of the pendulum arm in order to attract the permanent magnet and, following passage of the permanent magnet from the electromagnet, to allow the permanent magnet to move away. In this manner, the electromagnet, employing a very small amount of power, is able to move the pendulum back and forth.

At least one coil, and preferably many coils, are held in a fixed relationship to the swinging of the pendulum. A member is connected to the pendulum and includes a magnet along the same. The magnet fixed to the member is capable of passing through the fixed coils in order to generate electrical current. The device may include multiple magnets and coils arranged along an arcuate path or in a circular path to achieve this result. Of course, conductors are located to communicate with the fixed coils and to transport the electrical energy or electricity for use as needed, i.e. to illuminate a space, to pump water, to charge a battery, and the like.

It may be apparent that a novel and useful electricity generating apparatus has been heretofore described.

It is therefore an object of the present invention to provide an electricity generating apparatus which is relatively simple to manufacture and maintain.

Another object of the present invention is to provide an electricity generating apparatus which is reliable and uses mechanical motion which is minimal relative prior art devices.

A further object of the present invention is to provide an electricity generating apparatus which utilizes the motion of a pendulum and generates electrical power by the interaction of permanent magnets and conducting coils.

A further object of the present invention is to provide an electricity generating apparatus which operates with a minimum of friction resistance.

Another object of the present invention is to provide an electricity generating apparatus which utilizes known elements in a unique manner to produce electrical power in a highly efficient manner.

A further object of the present invention is to provide an electricity generating apparatus utilizing a stator having a plurality of coils sandwiched between a pair of rotators, one holding magnets oriented in a first direction and another having magnets oriented in another direction such that electricity is generated by the coils when the rotators turn relative to the stator.

A further object of the present invention is to provide an electricity generating apparatus using a stator and a pair of rotors that are turned by an arm that itself rotates 360 degrees.

A further object of the present invention is to provide an electricity generating apparatus which employs a capacitor bank in the storage of electrical power.

The invention passes other objects and advantages which will become apparent as the specification continues.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

Figure 1:
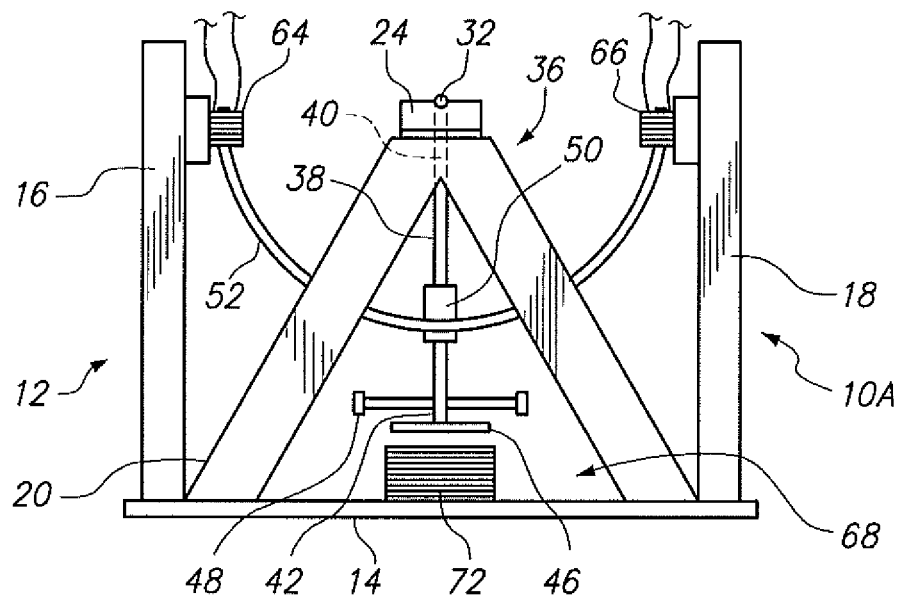
FIG. 1 is a side elevational view of the apparatus of the present invention with the pendulum in a neutral position
Figure 2:
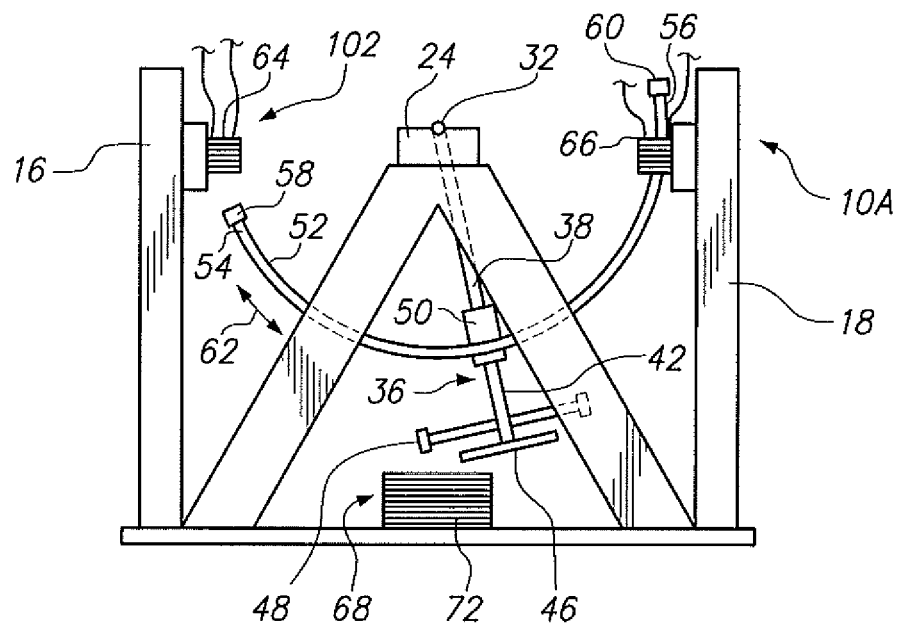
FIG. 2 is a side elevational view of the apparatus of the present invention with the pendulum in a swinging configuration.
Figure 3:
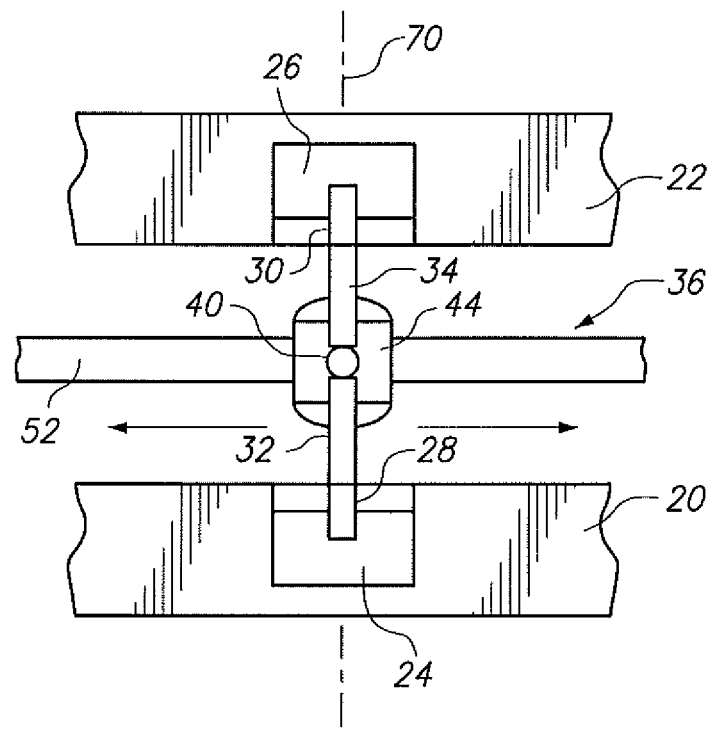
FIG. 3 is a top plan view of the apparatus of the present invention, in part.

Embodiments of the invention are noted in the drawings by reference character 10 followed by an upper case letter. A preferred embodiment of the invention 10A is depicted in FIG. 1 and FIG. 2. Electricity generating apparatus 10A includes as one of its elements support 12. Support 12 is formed with a base 14 having mounts 16 and 18 connected thereto. Pairs of legs 20 and 22 also extends from base 14, FIGS. 1-3. Brackets 24 and 26 lie atop pairs of legs 20 and 22 respectively. Grooves 28 and 30 are found in brackets 24 and 26 to accept rods 32 and 34 which are a portion of pendulum unit 36.

Pendulum unit 36 includes as one of its elements a pendulum arm 38 that possesses a first end portion 40 and a second end portion 42. First end portion 40 of pendulum arm 38 fits into a fixture 44 which also holds rods 32 and 34 in place, FIG. 3. Needless to say, pendulum arm 38 extends downwardly and terminates in a second end portion 42 which is connected to a permanent magnet 46. Arm 38 of pendulum 36 also may include an adjustable weight 48.

Again referring to FIGS. 1-3, clamp 50 along arm 38 holds member 52 which is generally semicircular in configuration. Member 52 includes terminii 54 and 56 having permanent magnets 58 and 60 thereat. Permanent magnets 58 and 60 may be of any suitable type such as rare earth magnets (neodymium). As heretofore mentioned, pendulum arm 38 swings in an arcuate path and it should be realized that member 52 also follows an arcuate path as indicated by directional arrow 62. Springs may be placed on mounts 16 and 18 to contact pendulum arm 38 during its swinging motion to further aid the arcuate movement of pendulum 36.

Figure 4:
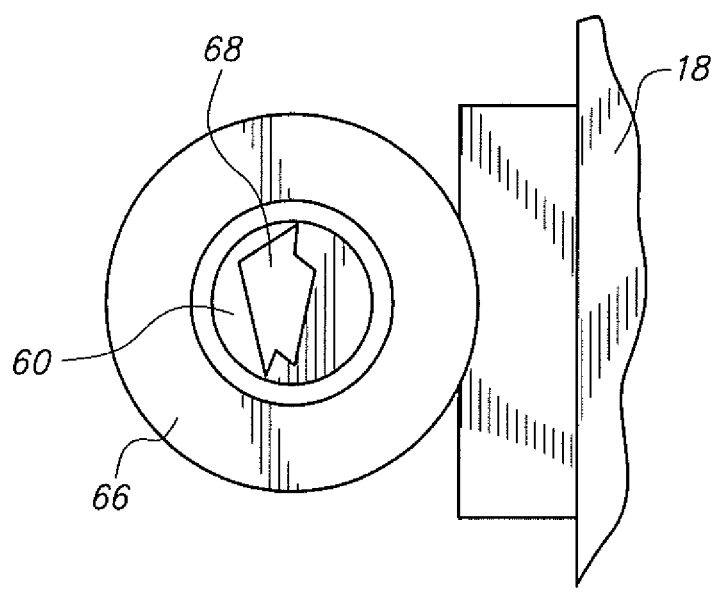
FIG. 4 is a top plan view of a permanent magnet interacting with a fixed coil of the apparatus depicted in FIG. 1, and FIG. 2.

Coils 64 and 66 are held to mounts 16 and 18, respectively. The positioning of coils 64 and 66 is pre-determined in order to allow magnets 58 and 60 to pass through coils 64 and 66, respectively. FIG. 2 shows that permanent magnet 60 has passed through coil 66. Such passage is indicated in FIG. 4, the dynamic being noted by directional arrow 68.

Figure 5:
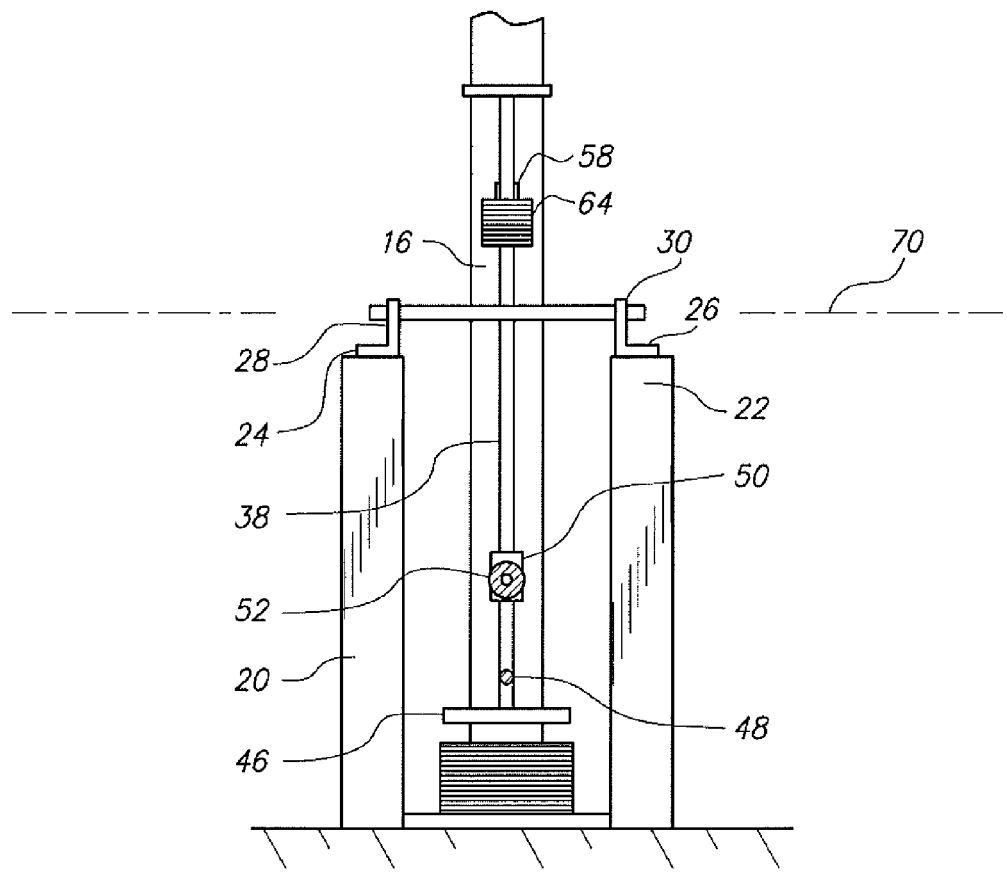
FIG. 5 is a right side view of the apparatus of the present invention.
Figure 6:
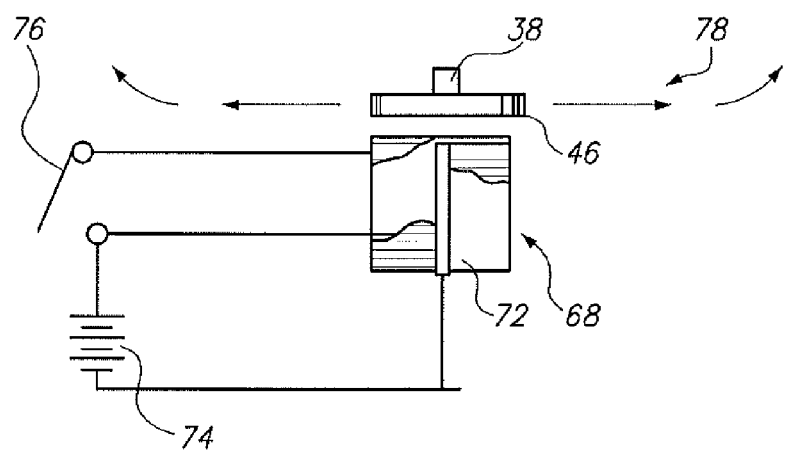
FIG. 6 is a schematic view depicting the switch mechanism used with the pendulum arm of the apparatus of the present invention.

Apparatus 10 is also provided with an actuator 68 for aiding the swinging of pendulum arm 38 and rods 30 and 32, which lie along axis 70, FIG. 5. With reference to FIG. 6, it may be seen that actuator 68 includes an electromagnetic coil 72 which is activated by a source of electrical power 74. Switch 76 is operated to selectively activate electromagnetic coil 72, which in turn produces a magnetic field that attracts permanent magnet 46 when pendulum arm 38 approaches electromagnet coil 72. Likewise, switch 76 is deactivated when arm 38 and permanent magnet 36 pass from electromagnet coil 72. Thus, actuator 68 serves to maintain the swinging motion of pendulum 36, indicated by directional arrows 78

Figure 7:
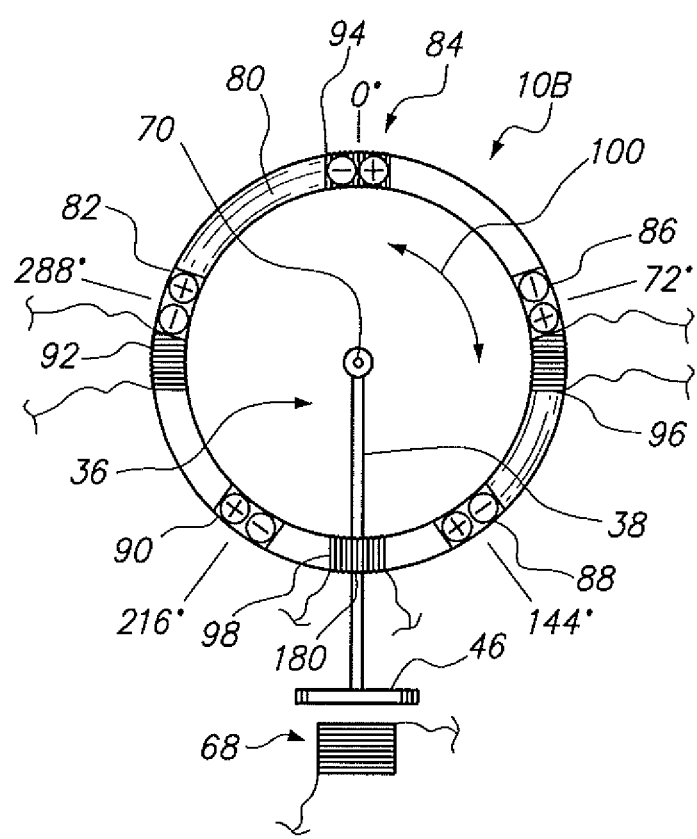
FIG. 7 is a schematic view of another embodiment of the present invention.

Turning to FIG. 7, it may be seen that another embodiment of 10B of the present invention is shown. In this embodiment 10B, pendulum 36 having permanent magnet 46 is depicted schematically. Actuator 68 again maintains the swinging of pendulum 36, specifically arm 38 thereof, about axis 70. However, member 80 is a circular body having fixed magnets 82, 84, 86, 88, and 90. Coils 92, 94, 96, and 98 lie stationary relative to member 80 which is connected to pendulum arm 38. Directional arrow 100 indicates the swinging movement of member 80, and permanent magnets 82, 84, 86, 88, and 90 relative to stationary coils 92, 94, 96, and 98. Plurality of conductors 102 connected to each of the coils 92, 94, 96, and 98 transport electricity generated by apparatus 10B.

Figure 8:
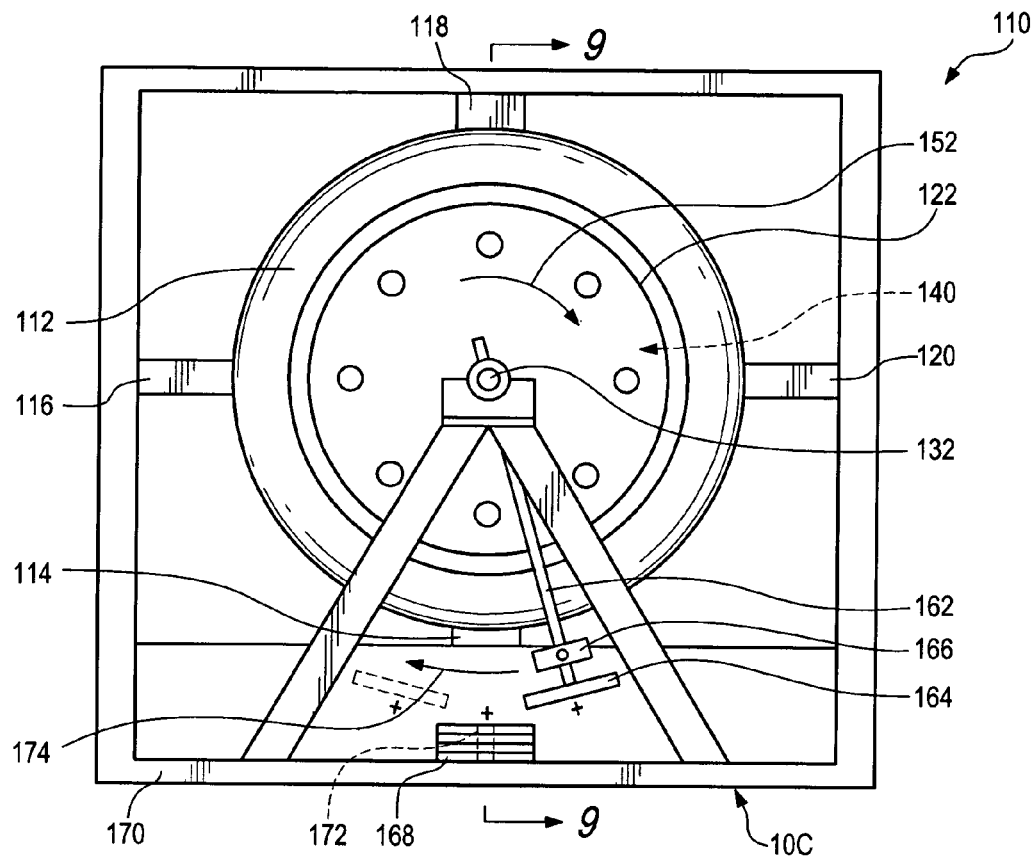
FIG. 8 is a front elevational view of a third embodiment of the present invention.
Figure 9:
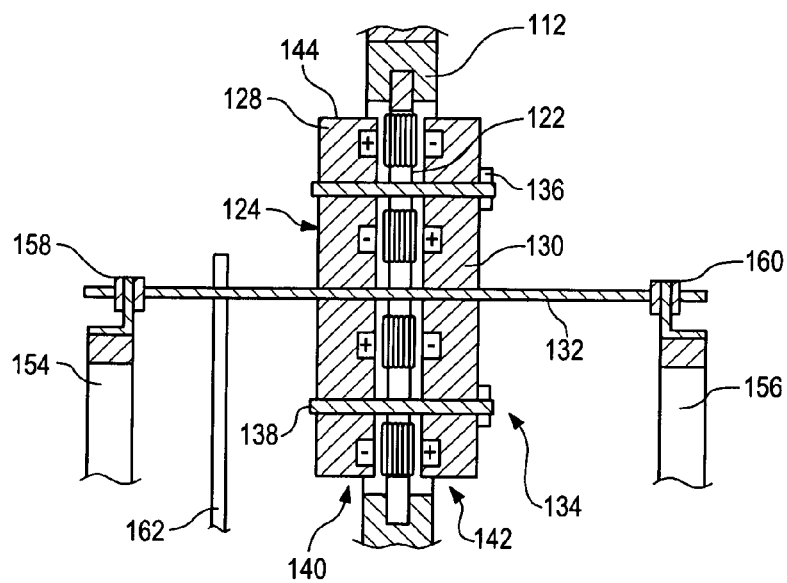
FIG. 9 is a sectional view taken along line 9-9 of FIG. 8 with portions shown partially.
Figure 10:
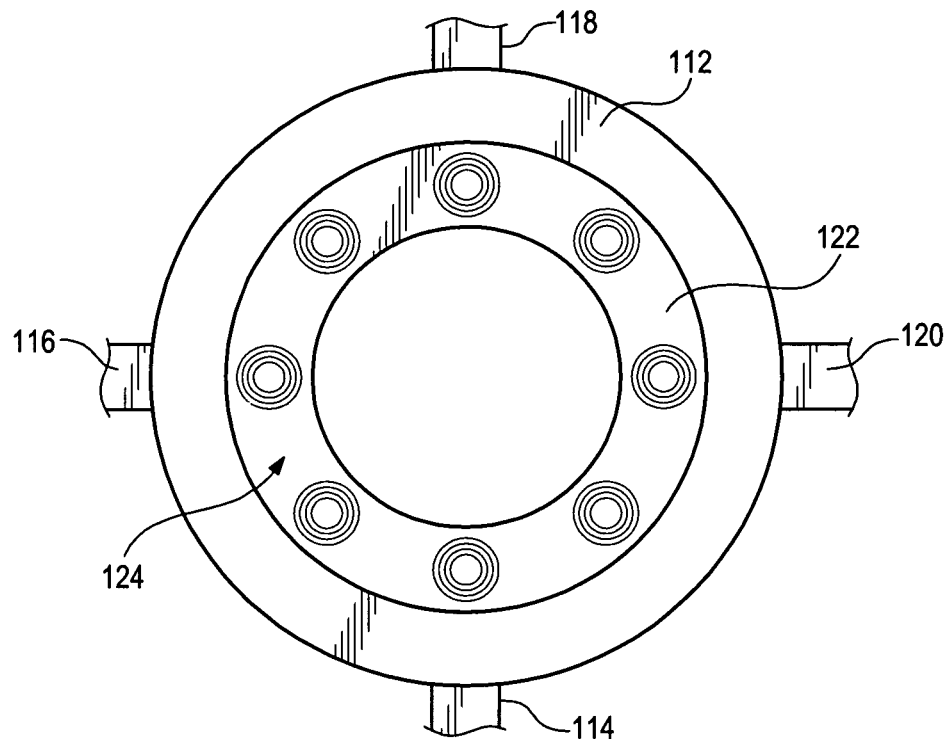
FIG. 10 is a plan view of the stator portion of the device of FIG. 8.

Referring now to FIGS. 8 and 9, another embodiment 10C of the present invention is shown. The electricity generating apparatus includes a frame 110 that supports a stator 112. Stator 112 is connected to frame 110 by supports 114, 116, 118, and 120. Stator 112 includes a central recessed, ring-shaped portion 122 which holds a plurality of conductive coils 124, best shown in FIGS. 9 and 10. Of course, conductive coils 124 are electrically connected to each other in order to conduct electricity to a storage medium, such as a battery 126, or to a user of electricity, load 194, shown in block format on FIG. 13.

Figure 11:
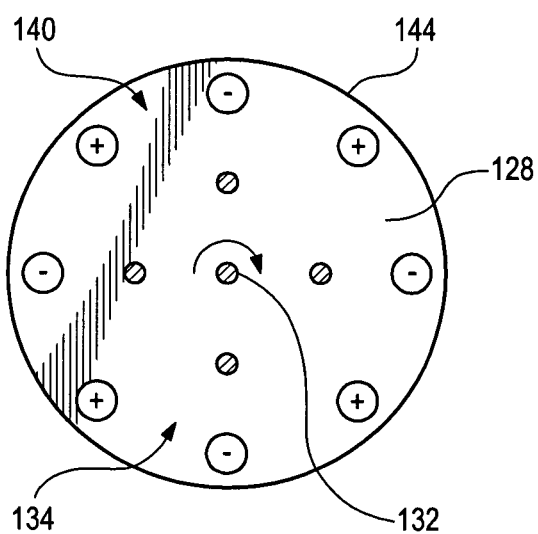
FIG. 11 is a plan view of one of the rotors depicted in FIG. 9.

Sandwiching stator 112 are a pair of rotors 128 and 130 that are turned by shaft 132. Rotors 128 and 130 are connected to each other by a plurality of bolts and nuts 134. Referring to FIG. 9, it may be observed that bolts and nuts 136 and 138 are depicted in section. Most importantly, each rotor 128 and 130 holds a plurality of magnets 140 and 142 respectively, FIG. 9. With reference to FIG. 11, it may be observed that a single rotor 128 is shown with plurality of magnets 140 numbering eight and all. The plurality of successive magnets about the perimeter 144 of rotor 128 possess alternate polarity, as depicted by successive plus and minus signs about rotor 128. It should be noted that rotor 130 is very similar to rotor 128 except that the polarity orientation of the magnets on rotor 130 are the opposite of the polarity orientation of the magnets on rotor 128. That is to say, in the embodiment shown, the eight magnets on rotor 128 lie directly opposite the eight magnets on rotor 130. However, opposing magnets have opposite pluralities about rotators 128 and 130.

Figure 12:
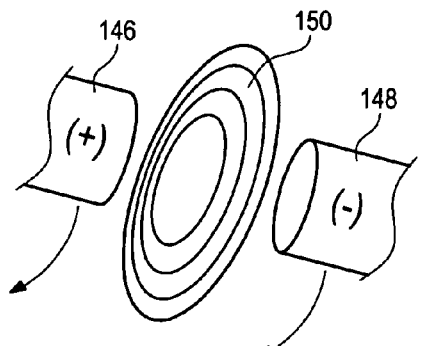
FIG. 12 is a schematic isometric view depicting a typical coil in the stator between a pair of magnets of opposite polarity found in a pair of rotors sandwiching the stator.

With reference to FIG. 12, it may be shown that an exemplary pair of opposing magnets 146 and 148 magnetically interact with coil 150 held by stator 112. Needless to say, magnet 146 is held and supported by rotor 128 while magnet 148 is held and supported by rotor 130. Directional arrow 152, FIG. 8 indicates the turning of rotors 128 and 130 about shaft 132. Plurality of magnets 140 and 142 may take the form of permanent magnets preferably neodymium type magnets and the like.

Referring again to FIGS. 8 and 9, it may be apparent that shaft 132 is horizontally supported by bearings 158 and 160 mounted on stands 154 and 156 respectively. Arm 162 is fixed to shaft 132. Permanent magnet 164 is located at the extremity of arm 162, while adjustable weight 166 lies above permanent magnet 166. Arm 162 is intended to rotate 360 degrees with shaft 132 to turn rotors 128 and 130, also fastened to rotatable shaft 132. A magnet coil 168 lies at base 170 of frame 110 and is operated to produce a magnetic field that repels permanent magnet 166 after such magnet passes over the midpoint of coil 168. In other words, coil 168 is activated when permanent magnet 166 attached to shaft 132 passes at or about the midpoint of coil 168, which has a metallic core 172.

In operation, apparatus 10A FIG. 1-6, is initiated by manually swinging pendulum 38 according to directional arrow 62, FIG. 2. Permanent magnets 58 and 60 on member 52 connected to pendulum arm 38 interact with fixed or stationary coils 64, and 66. Such coils are supported in place by mounts 16, and 18. Electrical energy is generated by such interactions and transported by plurality conductors 102 for use. Actuator 68, in the form of an electromagnet, is operated from power source 74 and is switched during an auspicious portion of the swinging cycle of pendulum 36. That is to say, as permanent magnet 46 of pendulum arm 38 approaches an operable magnetic field element such as electromagnetic 72, a magnetic field of electromagnet 72 is generated to pull the magnetic field of permanent magnet 46. When pendulum arm passes electromagnet 72, switch 76 is turned off. Such switching can take place manually or by the use of coordinating position sensors known in the art. In any case, pendulum 38 maintains its swing and continually generates electricity within the limitations of friction and wear. The same general process takes place with embodiment 10B of FIG. 7 in which member 80 rotates with pendulum 36 according to directional arrow 100. However in this case, multiple magnets 82, 84, 86, 88, and 90 interact with fixed or stationary coils 92, 94, 96, and 98 about axis 70. It should be noted that multiple apparatuses such as the one shown in 10B may be arrayed along axis 70 to increase the amount of electrical energy generated by apparatus 10B.

Figure 13:
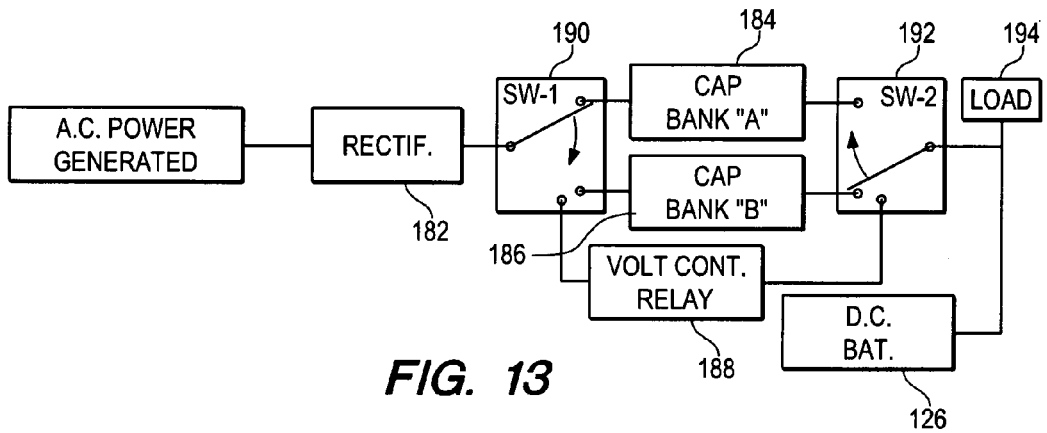
FIG. 13 is a block diagram depicting the general passage of power generated by the apparatus of FIG. 8 to a storage battery.
Figure 14:
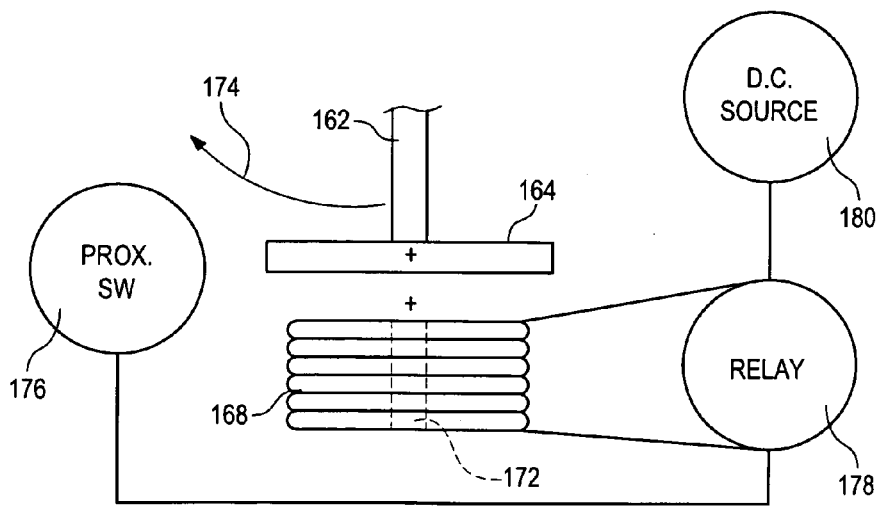
FIG. 14 is a schematic view of the interactions between the turning arm and a magnetic coil.

In the case of embodiment 10C the operation proceeds as follows. Arm 162 is initially manually rotated according to directional arrow 174, FIG. 8. Arm 162 then completes a revolution of 360 degrees which also turns rotors 128 and 130. The turning of rotors 128 and 130 allows plurality of permanent magnets 140 positioned within rotors 128 and 130 to pass plurality of coils 124 within stator 112, in order to generate electricity. Such relationship is illustrated schematically in FIG. 12, with respect to magnets 146 and 148 and coil 150. Once rotor swings downwardly, as illustrated on FIG. 8, passed the center point of coil 168, coil 168 is activated and produces a magnetic field of the same polarity as permanent magnet 164 at the end of arm 162. As shown in FIG. 8, a plus sign indicates the polarity of permanent magnet 164 and another plus sign indicates the polarity of coil 168. Of course, once arms 162 and permanent magnet 164 swings pass the center of coil 168, the activation of coil 168 and the momentum of arm 162 will allow arm 162 to make yet another 360 degree turn. Of course, coil 168 is deactivated once arm 162 and permanent magnet 164 pass over the same, but is again activated once arm 162 and permanent magnet 164 reach the center line or a point just pass the center line of coil 168. FIG. 14 illustrates such relationship in a greater detail where a proximity switch 176 detects the presence of arm 162 and permanent magnet 164 above magnetic coil 168. Relay 178 then allows the passage of DC power from a source 180 to magnetic coil 168 to produce the magnetic field which repels and pushes arm 162 and permanent magnet 164 along the direction indicated by directional arrow 174. FIG. 13 illustrates the use of power generated by device 10C and passed from plurality of coils 124, in that a rectifier 182 may be used to convert AC power generated by device 10C to DC power. From rectifier 182, power passes to capacitor banks 184 and 186, alternately, by the use of voltage control relay 188 and regulatory switches 190 and 192. The power from capacitor banks 184 and 186 are then directed to DC battery 126 or to a user represented by electrical load 194. Device 10C is preferably operated in a vacuum (not shown).

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An electrical generator apparatus comprising:
   a stator, said stator comprising a ring-shaped member, said ring-shaped member of said stator including a plurality of electrical coils held adjacent one another by said ring-shaped stator;
   a first rotor, said rotor comprising a ring-shaped member, said ring-shaped member including a plurality or permanent magnets being held adjacent one another by said ring-shaped member of said rotor;
   a second rotor, said second rotor comprising a ring-shaped member, said ring-shaped member including a plurality of permanent magnets being held adjacent one another by said ring-shaped member of said rotor;
   said first and second rotors being connected to one another, said first and second rotors sandwiching said stator;
   a rotatable shaft, said rotatable shaft being connected to said first and second rotors for turning of said first and second rotors with said rotatable shaft, said rotatable shaft being configured to permit rotation of said first and second rotors 360 degrees;
   an arm, said arm being fixed to said rotatable shaft for turning with said rotatable shaft, said arm including a magnet mounted therealong;
   an operable magnetic field element, said operable magnetic field element interacting with said magnet fixed to said arm during turning of said arm fixed to said rotatable shaft; and
   a switch for selectively activating said operable magnetic field element during said turning of said arm.

2. The apparatus of claim 1 in which said magnet mounted on said arm comprises a permanent magnet.

3. The apparatus of claim 1 in which said ring-shaped member of said first and second rotors each comprise a disc-shaped member.

4. The apparatus of claim 1 in which said shaft is supported in a generally horizontal configuration by at least one bearing.

\* \* \* \* \*